(12) United States Patent
Caine et al.

(10) Patent No.: US 12,466,076 B2
(45) Date of Patent: Nov. 11, 2025

(54) AUTONOMOUS ROBOT GUIDANCE SYSTEMS AND RELATED METHODS

(71) Applicant: Ocado Innovation Limited, Hatfield (GB)

(72) Inventors: Michael Caine, Needham, MA (US); Daryl van Kampen, Las Vegas, NV (US); Callum Gow, Cambridge, MA (US); Maxwell Brandon Hurd, Calgary (CA)

(73) Assignee: Ocado Innovatin Limited, Hatfield (GB)

( * ) Notice: Subject to any disclaimer, the term of this patent is extended or adjusted under 35 U.S.C. 154(b) by 83 days.

(21) Appl. No.: 18/190,593

(22) Filed: Mar. 27, 2023

(65) Prior Publication Data

US 2024/0326255 A1   Oct. 3, 2024

(51) Int. Cl.
   *B25J 9/16* (2006.01)
(52) U.S. Cl.
   CPC ......... *B25J 9/1697* (2013.01); *B25J 9/161* (2013.01); *B25J 9/163* (2013.01); *B25J 9/1664* (2013.01)
(58) Field of Classification Search
   CPC . B25J 9/1697; B25J 9/161; B25J 9/163; B25J 9/1664; G05D 1/686; G05D 1/244
   See application file for complete search history.

(56) References Cited

U.S. PATENT DOCUMENTS 9,349,181 B2 *   5/2016   Chandrasekar ...... G05D 1/0246
9,834,380 B2    12/2017   Hamilton et al.
2018/0292819 A1 * 10/2018   So .................... A47L 9/2857
2019/0163188 A1 *  5/2019   Walton ............... G06K 7/10009
2019/0265714 A1   8/2019   Ball et al.

(Continued)

FOREIGN PATENT DOCUMENTS

WO    2022266411 A1    12/2022

OTHER PUBLICATIONS

Häkkilä, Jonna, et al. "Projected fiducial markers for dynamic content display on guided tours." Proceedings of the 2016 CHI Conference Extended Abstracts on Human Factors in Computing Systems. 2016. (Year: 2016).*

(Continued)

*Primary Examiner* — Adam R Mott
*Assistant Examiner* — Matthew C Gammon
(74) *Attorney, Agent, or Firm* — Hanley, Flight & Zimmerman, LLC

(57) ABSTRACT

Autonomous robot guidance systems and related methods are disclosed. An example autonomous robot includes processor circuitry to detect a first fiducial based on image data collected while the robot is in a first drive mode, the first drive mode corresponding to an autonomous drive mode; cause the robot to switch from the first drive mode to a second drive mode responsive to the detection of the first fiducial, the robot to move in the second drive mode in a direction corresponding to a position of the first fiducial relative to the robot; generate navigation data for the robot, the navigation data indicative of a position of the robot in an environment; and cause the robot to switch from the second drive mode to the first drive, the robot to travel in the first drive mode based on the navigation data after the switch from the second drive mode.

20 Claims, 7 Drawing Sheets

(56) References Cited

U.S. PATENT DOCUMENTS

2019/0265722 A1* 8/2019 Haeusler ................ G06V 20/10
2022/0194245 A1* 6/2022 Gonano ................. B60L 53/37

OTHER PUBLICATIONS ("The Fiducial_follow App." The Fiducial_Follow App—Magni Documentation, Ubiquity Robotics, learn.ubiquityrobotics.com/fiducial_follow_app#the-fiducial_follow-app. Accessed Dec. 11, 2024. (Year: 2022).*
"Spot® Dock Information for Use." Boston Dynamics. 2021. (Year: 2021).*
April Robotics Laboratory, "AprilTag," retrieved from https://april.eecs.umich.edu/software/apriltag on Mar. 27, 2023, 3 pages.
International Searching Authority, "International Search Report," mailed in connection with International Patent Application No. PCT/EP2024/058344, on May 14, 2024, 4 pages.
International Searching Authority, "Written Opinion of the International Searching Authority," mailed in connection with International Patent Application No. PCT/EP2024/058344, on May 14, 2024, 9 pages.

* cited by examiner

AUTONOMOUS ROBOT GUIDANCE SYSTEMS AND RELATED METHODS

FIELD OF THE DISCLOSURE

This disclosure relates generally to autonomous robots and, more particularly, to autonomous robot guidance systems and related methods.

BACKGROUND

During travel of an autonomous robot in an environment, a position of the robot relative to the environment is monitored over time. Such position data is used to instruct the robot with respect to, for instance, a travel to a particular location in the environment.

BRIEF DESCRIPTION OF THE DRAWINGS

In general, the same reference numbers will be used throughout the drawing(s) and accompanying written description to refer to the same or like parts. The figures are not to scale.

Figure 1:
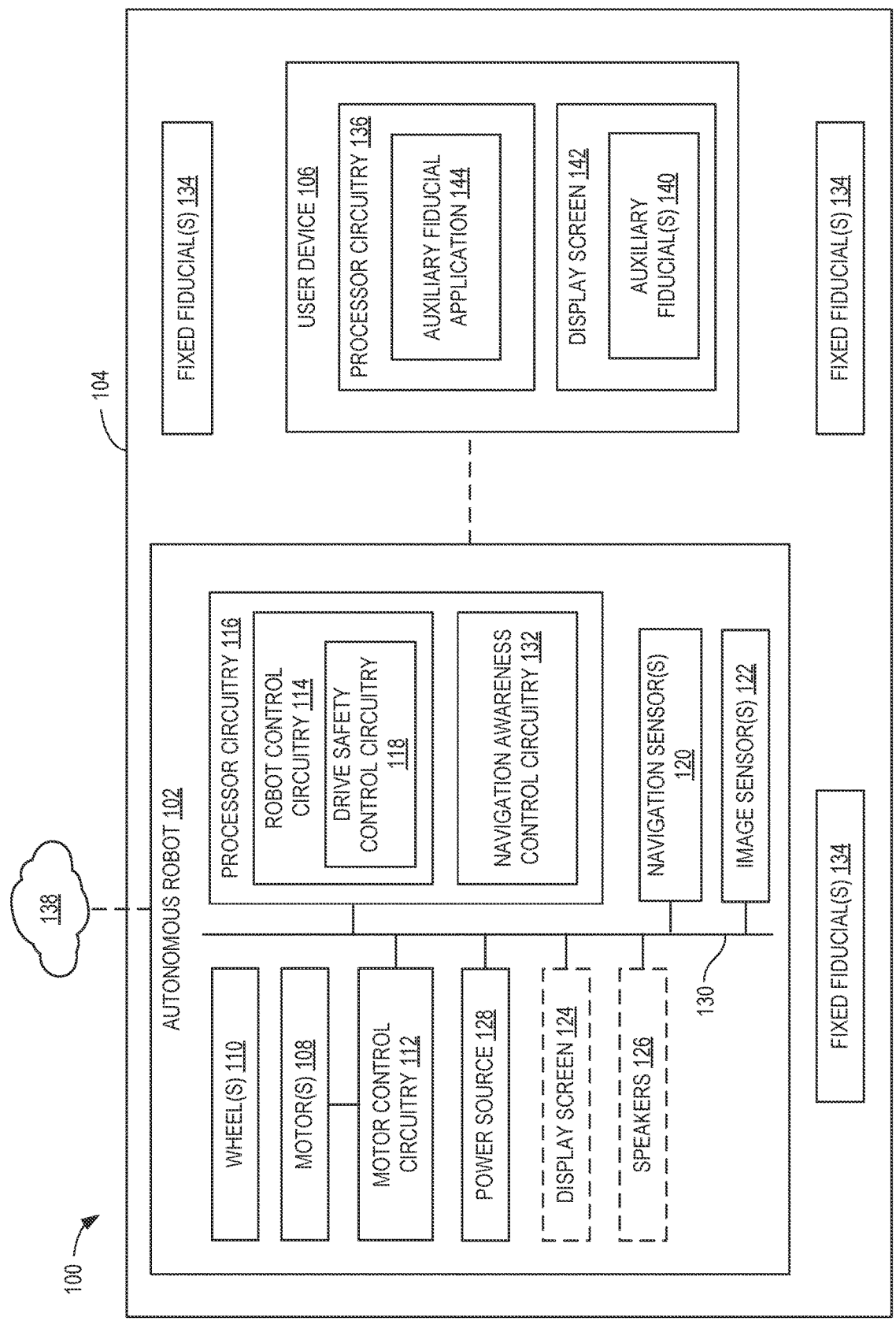
FIG. 1 illustrates an example system including an autonomous robot and navigation awareness control circuitry in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

During travel of an autonomous robot in an environment, a position of the robot relative to the environment is monitored over time. For instance, dead reckoning algorithms can be used to estimate a position of the robot at a given time based on a known starting location and estimates of speed and travel direction of the robot over time. However, in some instances, tracking of the position of the robot relative to the environment may be disrupted, which can cause the position data used to direct travel of the robot to become inaccurate. A fixed visual fiducial system, such as coded markers (e.g., QR codes) located on walls of a warehouse, can be used to re-orient the robot relative to the environment. For instance, when the marker is within a field of view of a camera of the robot, the fixed visual fiducial can be decoded by the robot to obtain values corresponding to location data for the fixed visual fiducial. The location data for the fixed visual fiducial can be used to adjust, update, or re-calibrate navigation data for the robot (e.g., coordinates of the robot in the environment).

In some instances, despite techniques such as dead reckoning and/or fixed fiducials, the robot may be unable to re-orient itself due to factors such as an extended duration of time without viewing a fixed fiducial, loss of wireless communication by the robot, etc. In some such instances, a user can cause the robot to enter a free-spin mode (e.g., via an input provided at the robot), in which the robot exits an autonomous drive mode and can be manually manipulated (e.g., pushed, pulled, spun) by the user. The user can move the robot to a particular location when the robot is in the free-spin mode, such as a location including a fixed fiducial to enable the robot to perform a re-orientation process.

However, some robots may have different shapes, sizes, weights, etc. that can affect an ability of a user to manually move the robot. For instance, a robot having a profile that is low to the ground or a robot carrying a load on a forklift may not be ergonomically safe and/or ergonomic for a user to push and/or pull by hand. Thus, free-spin mode enables users to move robots manually, but some robots are not designed or intended to be moved manually. Additionally, factors such as a weight of a load carried by the robot can affect the ability of the user to manually move the robot.

Disclosed herein are example visual fiducial systems to facilitate (re-)orientation of a navigation system of an autonomous robot relative to an environment using non-fixed visual fiduciaries (e.g., virtual markers). Examples disclosed herein provide for visual fiducials to be displayed via, for instance, a user device carried by an individual in the environment (e.g., a warehouse). The non-fixed visual fiducials supplement the guidance provided by the fixed fiducials and, thus, are referred to herein as auxiliary fiducials. When the auxiliary fiducial is detected within a field of view of image sensor(s) of the robot, navigation awareness control circuitry causes the robot to exit the autonomous drive mode and enter a guided drive mode. In the guided drive mode, the robot travels based on a position of the auxiliary fiducial (e.g., toward the auxiliary fiducial). In some examples, the user can direct (e.g., lead) the robot using the auxiliary fiducial displayed on the user device to a fixed fiducial in the environment. The robot can use the fixed fiducial to update the navigation data (e.g., position in the environment) and re-enter the autonomous drive mode.

In examples disclosed herein, an autonomous robot may output an indication that the navigation data of the robot is out-of-date, inaccurate, etc. Put another way, the robot is unable to orient itself in the environment due to, for instance, fixed fiducials being blocked, wireless communication disruptions, etc. Alternatively, the robot may be identified as lost by a dispatcher or warehouse management system. In examples disclosed herein, a user can cause the auxiliary visual fiducial marker to be displayed on a user device such as a handheld device. The user can present the auxiliary fiducial such that the auxiliary fiducial is detected within a field of view of the image sensor(s) of the autonomous robot. The navigation awareness control circuitry of the robot decodes the auxiliary fiducial. Upon recognition of the auxiliary fiducial, the robot enters the guided drive mode. In the guided drive mode, the robot moves with respect to the auxiliary fiducial (e.g., toward the auxiliary fiducial). The user can manipulate the robot by performing gestures with the user device while displaying the auxiliary fiducial to cause the robot to move in a particular direction (e.g., toward a fixed fiducial).

In some examples, the robot automatically exits the guided drive mode and re-enters the autonomous drive mode if the robot detects a fixed navigation fiducial while operating in the guided drive mode. In such examples, the navigation awareness control circuitry of the robot performs a re-orientation process using the fixed fiducial and continues performing tasks in the autonomous drive mode. In some examples, the user controls the switching of the robot from the guided drive mode to the autonomous drive mode. In some such examples, the robot remains in the guided drive mode until a user input is received even if a fixed fiducial is detected by the robot. For instance, the user can stop presentation of the non-fixed visual fiducial, which can cause the robot to switch from the guided drive mode to the autonomous drive mode. In some examples, the user provides an input via the user device or at the robot to cause the robot to switch from the guided drive mode to the autonomous drive mode or the free spin mode. Thus, in some examples, the user can cause the robot to enter and remain in the guided drive mode by presenting the auxiliary fiducial to move or reposition with or without the need for re-orientation of the robot.

FIG. 1 illustrates an example system 100 for guiding an autonomous robot 102 in an environment 104 (e.g., a warehouse) in accordance with teachings of this disclosure. The autonomous robot 102 can include, for example, an autonomous vehicle. In the example system 100 of FIG. 1, a user device 106 can be used by a user in the environment 104 to guide the robot 102 in instances in which, for example, the robot 102 is unable to orient itself within the environment 104.

In an autonomous drive mode, the example robot 102 of FIG. 1 moves in the environment 104 without or with limited user input control during movement of the robot 102. The example autonomous robot 102 of FIG. 2 includes one or more motors 108 (e.g., electric motor(s) and/or other drive mechanism(s)) to cause movement of the autonomous robot 102 via wheel(s) 110 of the robot 102. The autonomous robot 102 includes motor control circuitry 112 (e.g., hardware and/or software components) to control, for example, a speed of the robot 102.

The autonomous robot 102 includes robot control circuitry 114 to control movement of the autonomous robot 102. In the example of FIG. 1, the robot control circuitry 114 is implemented by processor circuitry 116 of the robot 102. The robot control circuitry 114 generates instructions to, for example, control travel of the robot 102 along a travel path to a location in the environment 104. For example, the robot control circuitry 114 generates instructions to cause the robot 102 to turn, travel forward, adjust speed, etc. The robot control circuitry 114 defines a travel trajectory for the robot 102 when the robot 102 is operating in the autonomous drive mode. The instructions generated by the robot control circuitry 114 can be transmitted to, for instance, the motor control circuitry 112. The robot control circuitry 114 includes drive safety control circuitry 118 that performs obstacle detection during travel of the robot 102, causes the robot 102 to perform maneuvers for collision avoidance, etc.

The example robot 102 of FIG. 1 includes sensors to generate outputs during, for example, movement of the robot 102 about the environment 104. The robot 102 of FIG. 1 includes navigation sensor(s) 120. The navigation sensor(s) 120 can include, for example, accelerometer(s), gyroscope(s), magnetometer(s), GPS receiver(s), etc. The example robot 102 includes image sensor(s) 122 (e.g., video camera(s), still camera(s)). The image sensor(s) 122 output, for example, image data (e.g., frames) representing the environment 104 during travel of the robot 102. The outputs of the navigation sensor(s) 120 and the image sensor(s) 122 can be analyzed by the robot control circuitry 114 with respect to controlling movement of the robot 102. The robot 102 can include other types of sensors, such as LiDAR sensors.

In some examples, the autonomous robot 102 includes a display screen 124 to provide visual outputs, receive user inputs via the display screen 124, etc. In some examples, the autonomous robot 102 includes speaker(s) 126 to provide audio outputs. The example robot 102 of FIG. 1 includes a power source 128 such as a battery to provide power to the components of the robot 102 communicatively coupled via a bus 130.

The example robot 102 of FIG. 1 includes navigation awareness control circuitry 132. The navigation awareness control circuitry 132 determines navigation data (e.g., location, orientation) for the robot 102 relative to the environment 104 as the robot 102 travels within the environment 104. In some examples, the navigation awareness control circuitry 132 executes algorithms such as dead reckoning algorithms to determine the position of the robot 102 in the environment 104 at a given time based on a previous known location of the robot 102 and outputs from the navigation sensor(s) 120 indicative of speed and direction of travel of the robot 102 over time. The navigation awareness control circuitry 132 generates navigation data indicative of, for instance, the position (e.g., coordinates) of the robot 102 in the environment 104 at a particular time, direction of travel, etc. The navigation data generated by the navigation awareness control circuitry 132 can be used by the robot control circuitry 114 with respect to causing the robot 102 to perform certain maneuvers (e.g., turning) when, for instance, traveling to a particular location in the environment 104 to enable the robot 102 to arrive at the location.

In some examples, the navigation awareness control circuitry 132 determines the position of the robot 102 relative to the environment 104 using one or more fixed fiducial markers 134 (referred herein as fixed fiducial(s) 134) located at corresponding known locations in the environment 104. The fixed fiducial(s) 134 can include, for instance, encoded markers (e.g., QR codes, AprilTags) that store coordinate data representing a fixed (e.g., known, non-changing, permanent) location of the marker in the environment 104. In the example of FIG. 1, the navigation awareness control circuitry 132 can recognize the fixed fiducial(s) 134 based on image data output by the image sensor(s) 122. In response to recognition of one of the fixed fiducials 134 within the field of view of the image sensor(s) 122, the navigation awareness control circuitry 132 can decode the position information stored in the fixed fiducial 134 and identify, update, and/or confirm the position of the robot 102 relative to the environment 104 at a particular time. The navigation awareness control circuitry 132 confirms or updates the navigation data based on detection of another fixed fiducial 134 at a subsequent time during a course of travel of the robot 102 within the environment 104. Thus, the navigation data can be periodically updated during travel of the autonomous robot 102 to maintain accurate position information for the robot 102.

In the example of FIG. 1, the navigation awareness control circuitry 132 is implemented by executable instructions executed on the processor circuitry 116 of the autonomous robot 102. However, in other examples, the navigation awareness control circuitry 132 is implemented by processor circuitry 136 of the user device 106 in communication with the autonomous robot 102 (e.g., via wired or wireless communication protocols), and/or by a cloud-based device 138 (e.g., one or more server(s), processor(s), and/or virtual machine(s)). In other examples, one or more components of the navigation awareness control circuitry 132 is implemented by dedicated circuitry located on the autonomous robot 102 and/or the user device 106. These components may be implemented in software, hardware, or in any combination of two or more of software, firmware, and/or hardware.

The robot control circuitry 114 cause the autonomous robot 102 to operate based on the navigation data mostly recently determined by the navigation awareness control circuitry 132. In some examples, the most recently generated navigation data may become outdated or inaccurate due to disruptions in the ability of the navigation awareness control circuitry 132 to determine the position of the robot 102. For example, sensor calibration errors or changes with respect to outputs of the navigation sensor(s) 120 over time due to, for instance, sensor drift, can affect the ability of the navigation awareness control circuitry 132 in orienting the robot 102 relative to the environment 104. In some examples, the fixed fiducial(s) 134 may be blocked from view of the image sensor(s) 122 of the robot 102 (e.g., due to inventory blocking one or more of fixed fiducials 134 in the warehouse). In such instances, the navigation awareness control circuitry 132 may go an extended period of time without being able to verify or update the position of robot 102. In some examples, the robot 102 may lose wireless communication capabilities, which can interfere with the ability of, for instance, the navigation awareness control circuitry 132 to detect and/or decode the information stored in the fixed fiducial(s) 134.

In some examples, the navigation awareness control circuitry 132 cause visual and/or audio output(s) to be generated to indicate that the position of the robot 102 has not been confirmed within, for instance, a threshold period of time, that the robot 102 is unable to find or follow a path of travel to a location, that the robot 102 has not reached the location within a threshold period of time, etc. In some examples, a user in the environment 104 may determine that the navigation data of the robot 102 is not accurate over a given time period based on monitoring of the robot 102 in the environment 104. For example, the robot 102 may not recognize that it is lost (e.g., the robot 102 believes it is traveling down aisle "A" when in reality the robot 102 is traveling down aisle "B"). In such examples, the operator may manually intervene to control the robot 102 (e.g., stop/pause movement of the robot 102) initiate re-localization of the robot 102.

In some examples, to enable the navigation awareness control circuitry 132 to re-orient the robot 102 relative to the environment 104, the user can cause the robot 102 to switch from an autonomous drive mode to a free-spin drive mode and manually move the robot 102 to, for instance, a fixed fiducial 134. For instance, the user can provide an input at the robot 102 that causes the motor control circuitry 112 to switch the motor(s) 108 to neutral to enable the user to move (e.g., push, pull, spin) the robot 102. When the robot 102 is placed by the user such that one of the fixed fiducials 134 is within the field of view of the image sensor(s) 122, the navigation awareness control circuitry 132 can use the fixed fiducial 134 to update the navigation data of the robot 102. The robot 102 can switch from the free-spin drive mode to the autonomous drive mode (e.g., via user inputs or automatically upon detecting the fixed fiducial 134). The robot 102 can continue autonomous operation based on the updated navigation data.

However, in some instances, it would be ergonomically unsafe or not ergonomic for a user to manually move (e.g., push, pull) the robot 102 due to, for instance, a weight of the robot 102 and/or load carried by the robot 102, a size of the robot 102, a profile of the robot 102 (e.g., a profile that is low to the ground). In other instances, a user may prefer not to manually move the robot 102 (e.g., because of user health conditions, general user preferences, etc.). In examples disclosed herein, an auxiliary fiducial system is used to maneuver the robot 102 and, in particular, enable the navigation awareness control circuitry 132 to update the navigation data to re-localize or re-orient the robot 102 in the environment 104.

In the example of FIG. 1, an auxiliary fiducial marker 140 (also referred to as an auxiliary fiducial 140) is presented on a display screen 142 of the user device 106 to enter the field of view of the image sensor(s) 122. Thus, in some examples, the auxiliary fiducial 140 is a virtual fiducial. In response to detection and decoding of the auxiliary fiducial 140, the navigation awareness control circuitry 132 causes the robot 102 to enter a guided drive mode. In the guided drive mode, the robot 102 operates semi-autonomously in that the robot 102 moves on its own (e.g., based on instructions from the robot control circuitry 114) and has capabilities such as obstacle detection and collision avoidance (based on instructions generated by the drive safety control circuitry) but a travel trajectory of the robot 102 is defined by the user. In the example of FIG. 1, when the robot 102 is in the guided drive mode, the travel trajectory of the robot 102 is based on the auxiliary fiducial 140. For instance, the navigation awareness control circuitry 132 cause the robot 102 to move in a direction corresponding to a position of the auxiliary fiducial 140, perform maneuvers to keep the auxiliary fiducial 140 within a field of view of the image sensor(s) 122, etc.

As disclosed herein, the user can perform gestures while holding the user device 106 with the auxiliary fiducial 140 displayed to direct movement of the robot 102. Thus, the auxiliary fiducial 140 can be considered a non-fixed fiducial, as the position of the auxiliary fiducial 140 depends on the user holding the user device 106, movement of the user device 106 by the user, etc. In some examples, the user can use the auxiliary fiducial 140 to direct the robot 102 to one of the fixed fiducials 134. In some examples, the navigation awareness control circuitry 132 analyzes image data generated while the robot 102 is in the guided drive mode to detect one of the fixed fiducials 134. In response to detecting the fixed fiducial 134, the navigation awareness control circuitry 132 identifies the position of the robot 102 relative to the environment 104. Thus, the navigation awareness control circuitry 132 updates or adjusts the navigation data that can be used by the robot control circuitry 114 in directing travel of the robot 102. As disclosed herein, the navigation awareness control circuitry 132 can cause the robot 102 to switch from the guided drive mode to the autonomous drive mode in response to a user input or based on rule(s) (e.g., in response to detecting the fixed fiducial 134, when the auxiliary fiducial 140 is no longer detected, etc.) to resume autonomous travel based on the updated data.

The user device 106 can include, for example, a handheld device, a wearable device worn on, for instance, a wrist of the user, etc. In the example of FIG. 1, an auxiliary fiducial application 144 is executed by the processor circuitry 136 of the user device 106. A user can activate the auxiliary fiducial application 144 to cause one or more auxiliary fiducials 140 to be presented on the display screen 142 of the user device 106.

The auxiliary fiducial(s) 140 can include encoded data. In some examples, the auxiliary fiducial(s) 140 and the fixed fiducial(s) 134 include different values or ranges of values using a same type of encoding (e.g., AprilTags with different values). In some examples, the auxiliary fiducial(s) 140 and the fixed fiducial(s) 134 include different types of fiducials. For instance, the fixed fiducial(s) 134 can include AprilTag(s) and the auxiliary fiducial 140 can include QR code(s). The encoded data of the auxiliary fiducial(s) 140 can include, for example, values or instructions indicating that the robot 102 should switch to the guided drive mode. Thus, the data associated with the auxiliary fiducial 140 differs from the data associated with the fixed fiducial(s) 134 (e.g., known position data of the fixed fiducial(s) 134 in the environment 104).

The auxiliary fiducial application 144 can cause the auxiliary fiducial(s) 140 to be presented until a user input is received at the user device 106 to end presentation of the auxiliary fiducial(s) 140. Alternatively, the auxiliary fiducial application 144 can display the auxiliary fiducial(s) 140 for a particular length of time (e.g., three minutes, five minutes).

The auxiliary fiducial application 144 can be in communication (e.g., wireless communication) with the navigation awareness control circuitry 132. For example, the user can provide input(s) via the auxiliary fiducial application 144 indicating that the robot 102 should switch from the guided drive mode to the autonomous drive mode. The input(s) received by the auxiliary fiducial application 144 at the user device 106 can be transmitted to the navigation awareness control circuitry 132.

Although examples disclosed herein are primarily discussed in connection with the auxiliary fiducial 140 as a virtual fiducial presented via the user device 106, in other examples, the auxiliary fiducial 140 could be a printed marker carried by the user (e.g., on a badge worn by the user). Thus, examples disclosed herein are not limited to virtual fiducials.

Figure 2:
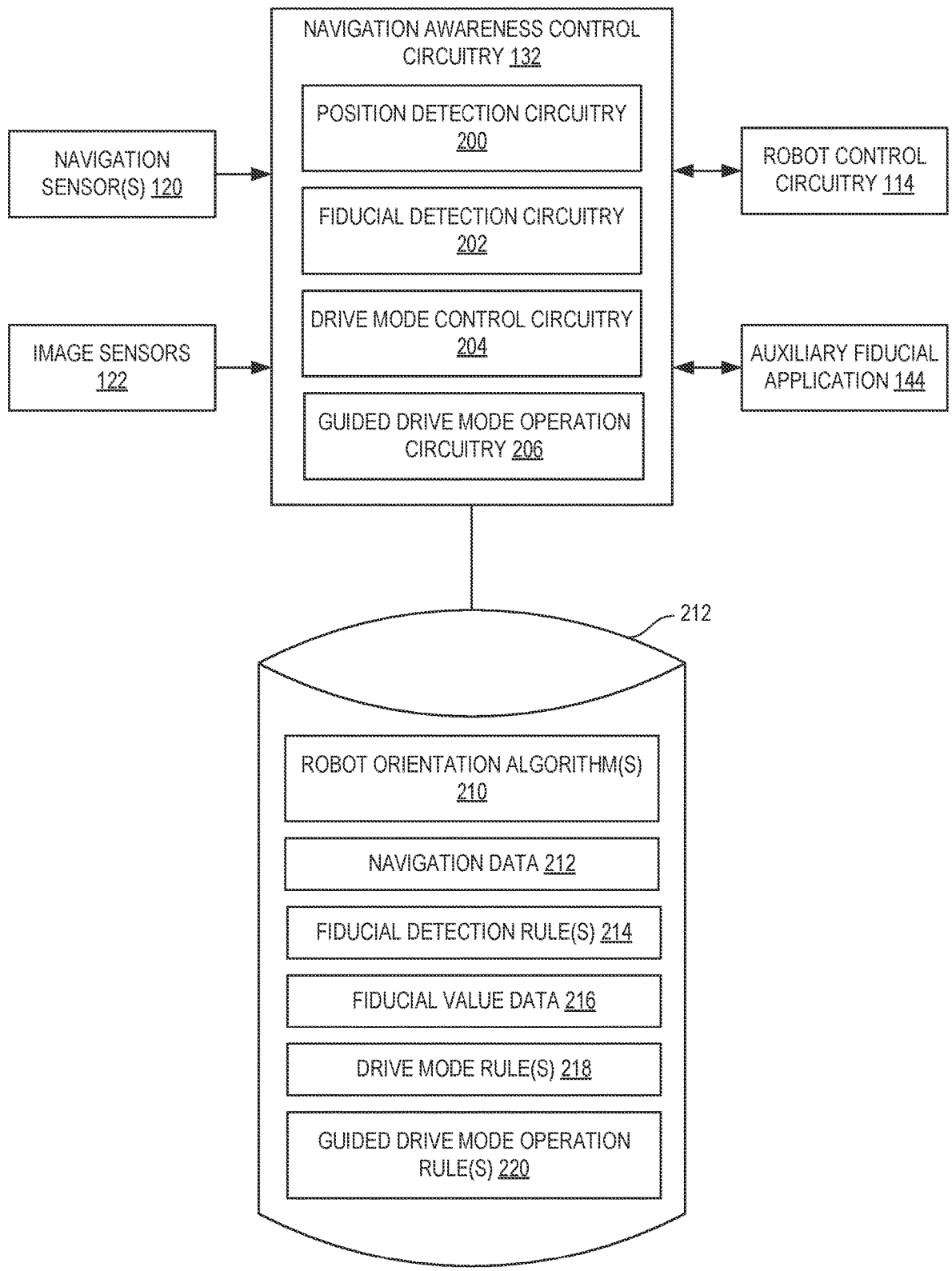
FIG. 2 is a block diagram of the example navigation awareness control circuitry of FIG. 1.

FIG. 2 is a block diagram of the navigation awareness control circuitry 132 to determine navigation data (e.g., position, direction of travel) of an autonomous robot such as the autonomous robot 102 of FIG. 1 relative to an environment (e.g., the environment 104, a warehouse). The navigation awareness control circuitry 132 of FIG. 2 may be instantiated (e.g., creating an instance of, bring into being for any length of time, materialize, implement, etc.) by processor circuitry such as a central processing unit executing instructions. Additionally or alternatively, the navigation awareness control circuitry 132 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example navigation awareness control circuitry 132 of FIG. 2 includes position detection circuitry 200, fiducial detection circuitry 202, drive mode control circuitry 204, and guided drive mode operation circuitry 206. In some examples, the position detection circuitry 200 is instantiated by processor circuitry executing position detection instructions and/or configured to perform operations such as those represented by the flowchart of FIG. 3. In some examples, the fiducial detection circuitry 202 is instantiated by processor circuitry executing fiducial detection instructions and/or configured to perform operations such as those represented by the flowchart of FIG. 3. In some examples, the drive mode control circuitry 204 is instantiated by processor circuitry executing drive mode control instructions and/or configured to perform operations such as those represented by the flowchart of FIG. 3. In some examples, the guided drive mode operation circuitry 206 is instantiated by processor circuitry executing guided drive mode control instructions and/or configured to perform operations such as those represented by the flowchart of FIG. 3.

The position detection circuitry 200 manages navigation awareness of the robot 102 relative to the environment 104. For example, during travel of the robot 102, the position detection circuitry 200 accesses outputs of the navigation sensor(s) 120 such as speed, direction of travel, etc. The position detection circuitry 200 can also access outputs of the image sensor(s) 122 and perform image analysis to detect properties of the environment 104 in which the robot 102 is traveling to recognize, for instance, particular locations (e.g., based on machine learning training).

The position detection circuitry 200 executes one or more robot orientation algorithms 210 to determine navigation data 212 (e.g., position, travel direction) for the robot 102 relative to the environment 104 at a particular time. The robot orientation algorithm(s) 210 can include, for instance, dead reckoning algorithms in which the position detection circuitry 200 estimates a (e.g., current) position of the robot 102 based on previously known position(s) of the robot 102 in the environment 104 and estimates of speed and travel direction of the robot 102 over time (e.g., based on the outputs of the navigation sensor(s) 120). The robot orientation algorithm(s) 210 and the navigation data 212 can be stored in a database 208. In some examples, the navigation awareness control circuitry 132 includes the database 208. In some examples, the database 208 is located external to the navigation awareness control circuitry 132 in a location accessible to the navigation awareness control circuitry 132 as shown in FIG. 2.

In some examples, the position detection circuitry 200 executes the robot orientation algorithm(s) 210 in response to detecting a fixed fiducial 134 in the environment 104. As disclosed herein, the fiducial detection circuitry 202 of the example navigation awareness control circuitry 132 of FIG. 2 can identify the fixed fiducial(s) 134 and decode the values stored by the fixed fiducial(s) 134, which can include, for example, coordinates corresponding to the location(s) of the fixed fiducial(s) 134 in the environment 104. The position detection circuitry executes the robot orientation algorithm(s) 210 based on the data decoded from the fixed fiducial(s) 134 to determine the navigation data 212 (e.g., position, travel direction) to orient the robot 102 relative to the environment. For example, the position detection circuitry 200 can use the data decoded from one of the fixed fiducials 134 to derive the position of the robot 102 in the environment 104 by mapping the robot 102 relative to the location of the fixed fiducial 134 in the environment 104.

The position detection circuitry 200 verifies or updates the navigation data 212 over time based on, for example, additional data received from the navigation sensor(s) 120 and/or the image sensor(s) 122, detection of another fixed fiducial 134, etc. The robot control circuitry 114 of the example autonomous robot 102 of FIG. 1 can communicate with the position detection circuitry 200 to access the navigation data 212 for use in controlling movement of the robot 102. In some examples, the robot control circuitry 114 accesses the navigation data 212 directly from the database 208.

In some examples, if the position detection circuitry 200 is unable to verify or update the navigation data 212 for the robot 102 after a threshold period of time or number of attempts, the position detection circuitry 200 can cause the robot 102 to generate output(s) to alert, for instance, user(s) in the environment 104 that the robot 102 may be operating based on inaccurate or out-of-date navigation data 212. In some examples, the robot 102 determines that it is lost when sensor data (e.g., the navigation data 212, data from the navigation sensor(s) 120 and/or the image sensor(s) 122, LiDAR sensor data, etc. does not match data expected for a particular location on a map. In some examples, the position detection circuitry 200 outputs the alert(s) in response to data from the robot control circuitry 114 indicating that the robot 102 did not reach a destination within an expected time, is not on a designated travel path, etc. The alert(s) can include, for example, activation of lights on the robot 102, presentation of notifications on the display screen 124 of the robot 102, and/or audio outputs via the speaker(s) 126. In some examples, the alert(s) can include wireless notifications received via the auxiliary fiducial application 144 and presented via the display screen 142 of the user device 106. As disclosed herein, when the position detection circuitry 200 is unable to verify or update the navigation data 212, a user can instruct the auxiliary fiducial application 144 to cause the auxiliary fiducial 140 to be presented to guide the robot 102.

The fiducial detection circuitry 202 of the example navigation awareness control circuitry 132 of FIG. 2 analyzes the image data generated by the sensor(s) 122 during operation of the robot 102 to identify a navigation fiducial (e.g., the fixed fiducial(s) 134, the auxiliary fiducial(s) 140) within a field of view of the image sensor(s) 122. The fiducial detection circuitry 202 executes fiducial detection rule(s) 214 to identify the fiducial(s) 134, 140. For example, the fiducial detection rule(s) 214 can instruct the fiducial detection circuitry 202 to access an image stream generated by the image sensor(s) 122 and perform image analysis to recognize a fiducial 134, 140 in the image(s) (e.g., based on machine learning training). Based on fiducial detection rule(s) 214, the fiducial detection circuitry 202 can access the image data periodically, in response to the position detection circuitry 200 determining that the navigation data 212 has not been updated for a threshold period of time, based on user input(s) received via the auxiliary fiducial application 144, etc. The fiducial detection rule(s) 214 can be defined based on user inputs and stored in the database 208. In some examples, the fiducial detection rule(s) 214 instruct the fiducial detection circuitry 202 to scan the image data periodically to identify the fiducial(s) 134, 140 to cause the position detection circuitry 200 to confirm or update the navigation data 212 even if the position detection circuitry 200 has not recognized that the navigation data 212 may be out-of-date or inaccurate.

Upon detection of one of the fixed fiducial(s) 134 or the auxiliary fiducial(s) 140, the fiducial detection circuitry 202 decodes the data (e.g., values) stored in the fiducial. For the fixed fiducial(s) 134, the values can identify the (e.g., permanent, known) location of the respective fixed fiducials 134 in the environment 104. For the auxiliary fiducial(s) 140, the values can indicate that the fiducial is intended to assist with navigation of the robot 102 and that the robot 102 should enter the guided drive mode (e.g., switch from the autonomous drive mode to the guided drive mode). The fiducial value(s) can be stored in the database 208 as fiducial value data 216.

In some examples, the environment 104 includes more than one autonomous robot 102 traveling within the environment 104. When the auxiliary fiducial 140 is displayed via the user device 106, the user can maneuver the user device 106 to place the auxiliary fiducial 140 within the field of view of the image sensor(s) 122 of the robot 102 for which the auxiliary fiducial 140 is intended to be presented. However, at a given time, the auxiliary fiducial 140 may additionally or alternatively be within at least a portion of the field of view of image sensor(s) 122 of one or more other the robot(s) 102 for which the auxiliary fiducial 140 is not intended to be presented. To avoid disruptions to the travel of the robot(s) 102 for which the auxiliary fiducial 140 is not intended, the fiducial detection rule(s) 214 can define criteria for identifying an auxiliary fiducial 140 as intended for a particular robot 102.

For example, the fiducial detection rule(s) 214 can indicate that the fiducial detection circuitry 202 should recognize an auxiliary fiducial 140 as intended for a particular robot 102 when the auxiliary fiducial 140 is located within a portion or subset of the field of view of the image sensor(s) 122 or when the auxiliary fiducial 140 is captured with at least a minimum size (e.g., pixel) value in the image data. In some examples, the fiducial detection rule(s) 214 can indicate that the fiducial detection circuitry 202 should recognizes an auxiliary fiducial 140 as intended for a particular robot 102 when the auxiliary fiducial 140 is detected within the image data generated by the images sensor(s) 122 for a threshold duration of time.

Such parameters defined by the fiducial detection rule(s) 214 for recognizing an auxiliary fiducial 140 as intended for a first robot 102 prevent, for instance, other robot(s) 102 in the environment 104 from responding to an auxiliary fiducial 140 that was intended for the first robot, but may have been captured within a peripheral vision of the image sensor(s) 122 of the other robot(s) (e.g., at an edge of the field of view of the image sensor(s) 122 of the other robot(s) 102, by a secondary camera of the other robot(s) 102, etc.). In some examples, when an auxiliary fiducial 141 is detected, the fiducial detection circuitry 202 periodically confirms that the auxiliary fiducial 140 is still within the field of view of the image sensor(s) 122 and satisfies the fiducial detection rule(s) 214. As disclosed herein, in some examples, if the auxiliary fiducial 140 is no longer within the field of view of the mage sensor(s) 122, the drive mode control circuitry 206 adjusts a drive mode of the robot 102 from the guided drive mode to the autonomous drive mode.

In some examples, when the fiducial detection circuitry 202 detects an auxiliary fiducial 140, the fiducial detection circuitry 202 increases a frequency at which the fiducial detection circuitry 202 scans the image data generated by the image sensor(s) 122 to identify a fixed fiducial 134 in the environment 104 as compared to operation of the robot 102 in the absence of an auxiliary fiducial 140. The increased frequency of scanning for a fixed fiducial 134 that the position detection circuitry 200 can use to adjust the navigation data 212 for the robot 102 can minimize an amount of user involvement in directing the robot 102 via the auxiliary fiducial 140. For example, the drive mode control circuitry 206 can switch the robot 102 from the guided drive mode to the autonomous drive mode sooner in response to detection of the fixed fiducial 134 based on the increased frequency of scanning the image data for the fixed fiducial 134.

The drive mode control circuitry 204 of the example navigation awareness control circuitry 132 of FIG. 2 causes the autonomous robot 102 to operate in an autonomous drive mode, a guided drive mode, or a free spin mode. As discussed in connection with FIG. 1, in the autonomous drive mode, the robot 102 moves with no or substantially no user instruction. In the guided drive mode, the robot 102 operates semi-autonomously in that the robot 102 moves on its own and has capabilities such as obstacle detection and collision avoidance but a travel trajectory of the robot is defined by the user via presentation of the auxiliary fiducial 140 on the user device 106. As discussed herein, the user can perform gestures while holding the device on which the auxiliary fiducial 140 is displayed to cause the robot to move with respect to the auxiliary fiducial 140 (e.g., move toward the auxiliary fiducial 140). In the free spin mode, the motor control circuitry 112 causes the motor(s) 108 to switch to a neutral state and the robot 102 can be manually moved (e.g., pushed, pulled) by a user.

In response to the detection of an auxiliary fiducial 140 by the fiducial detection circuitry 202, the drive mode control circuitry 204 causes the robot 102 to switch from operating in the autonomous drive mode to operating in the guided drive mode. For example, the drive mode control circuitry 204 outputs instructions to the robot control circuitry 114 to cause the robot control circuitry 114 to refrain from instructing the robot 102 to move along a travel path defined by the robot control circuitry 114. Rather, as disclosed herein, in the guided drive mode, the robot control circuitry 114 waits for instructions from the guided drive mode operation circuitry 206 with respect to the maneuvers to be performed by the robot 102 in view of a position of the auxiliary fiducial 140 relative to the robot 102.

The drive mode control circuitry 204 executes drive mode rule(s) 218 to control switching between the drive modes. The drive mode rule(s) 218 can be defined by user inputs and stored in the database 208. In some examples, based on the drive mode rule(s) 218, the drive mode control circuitry 204 waits to cause the robot 102 to switch to the guided drive mode until the fiducial detection circuitry 202 recognizes the auxiliary fiducial 140 for a threshold period of time. In some examples, the drive mode control circuitry 204 causes the robot 102 to generate outputs (e.g., audio outputs, visual outputs) to indicate that the robot 102 is switching drive modes.

The drive mode rule(s) 218 can also define criteria for switching from the guided drive mode to another drive mode such as the autonomous drive mode. The drive mode rule(s) 218 can indicate that the robot 102 should switch from the guided drive mode to the autonomous drive mode in response to the position detection circuitry 200 confirming that the navigation data 212 has been updated. The drive mode rule(s) 218 can indicate that the robot 102 should switch from the guided drive mode to the autonomous drive mode in response to the fiducial detection circuitry 202 identifying a fixed fiducial 134 while the robot 102 is in the guided drive mode. In some examples, based on the drive mode rule(s) 218, the drive mode control circuitry 204 waits a threshold amount of time before causing the robot 102 to switch from the guided drive mode to the autonomous drive mode in response to the fiducial detection circuitry 202 identifying a fixed fiducial 134 (e.g., to verify that the position detection circuitry 200 has successfully re-oriented the robot 102 by updating the navigation data 212 using the fixed fiducial 134).

In some examples, drive mode rule(s) 218 instruct the drive mode control circuitry 204 to cause the robot 102 to switch from the guided drive mode to another mode (e.g., the autonomous drive mode, the free-spin mode) in response to, for instance, the auxiliary fiducial 140 no longer being detected by the fiducial detection circuitry 202. For instance, the user can provide an input to the auxiliary fiducial application 144 to cease presentation of the auxiliary fiducial 140. In response to the auxiliary fiducial 140 no longer being displayed, the drive mode rule(s) 218 can indicate that, for instance, the robot 102 should switch to autonomous drive mode to resume autonomous operation (e.g., based on the expectation that when the auxiliary fiducial 140 no longer being displayed, the robot 102 has been guided to the fixed fiducial 134 to update the navigation data and re-localize the robot). In some examples, the drive mode rule(s) 218 indicate that the robot 102 should switch from the guided drive mode to the autonomous drive mode when the auxiliary fiducial 140 is no longer being displayed and the fiducial detection circuitry 202 detects a fixed fiducial 134 and/or the position detection circuitry 200 confirms that the navigation data 212 has been updated.

In some examples, the drive mode control circuitry 204 causes the robot 102 to switch from the guided drive mode to another mode in response to a user input at the user device 106 and/or the robot 102. In some examples, the auxiliary fiducial application 144 can permit a user to cause the robot 102 to switch from the guided drive mode to the autonomous drive mode or the free spin mode based on user input(s) at the user device 106. The ability to control the drive modes of the robot 102 via the auxiliary fiducial application 144 (or at the robot 102 via, for instance, the display screen 124) can be based on, for instance, user permissions or settings. For instance, a more experienced user may be granted permissions to control the drive mode of the robot 102 using the auxiliary fiducial application 144. In such examples, the drive mode control circuitry 204 adjusts the drive mode of the robot 102 based on the user input(s) received by the auxiliary fiducial application 144 or at the robot 102.

In some examples, the user instructs the robot 102 to switch from the guided drive mode to the free spin mode. For instance, the user could use the auxiliary fiducial 140 cause the robot 102 to switch from the autonomous drive mode to the guided drive mode to direct the robot 102 from, for instance, an area in the environment 104 that includes tight spaces, obstacles, etc. that may prevent the user from accessing or easily accessing the robot 102. The drive mode control circuitry 204 causes the robot 102 to switch to the guided drive mode in response detection of the auxiliary fiducial 140 by the fiducial detection circuitry 202. As disclosed herein, the guided drive mode operation circuitry 206 can instruct the robot 102 to move based on a position of the auxiliary fiducial 140 relative to the robot 102. When the robot 102 is in a location in the environment 104 in which the user can access the robot 102, the user can provide an input via, for instance, the auxiliary fiducial application 144 indicating that the robot 102 should switch to the free spin mode. In response to the user input, the drive mode control circuitry 204 instructs the robot control circuitry 114 to cause the robot 102 to operate in the free spin mode. The user can manually move the robot 102 to, for instance, a fixed fiducial in the environment 104 to cause the position detection circuitry 200 to re-orient the robot 102.

In some instances, the user manually moves the robot 102 to reposition the robot 102 after the robot 102 is manipulated via the guided drive mode to reposition the robot 102 for purposes other than re-orienting the robot 102. For example, if the robot 102 becomes trapped in a location but the navigation data 212 remains accurate, the user can use the guided drive mode to maneuver the robot 102 from the location and then manually move the robot 102 to reposition the robot 102 in the environment 104 without the position detection circuitry 200 updating the navigation data 212. For instance, a travel path of the robot may be temporarily blocked by, for example, another robot or by materials moved into the travel path (e.g., an aisle) by another operator. In this case, the robot 102 can be manually moved while in free spin mode to enable another operation to take place or the blockage to be removed before to robot 102 proceeds with, for instance, autonomous movement. In some examples, the robot 102 may be moved into a temporary storage area, such as a crate for shipping, while in the free spin mode. In some examples, the robot 102 may be located in a rapidly changing area of the warehouse, such as near a loading dock where a field of pallets are being shipped or received. In this example, the free spin mode can be used to relocate the robot away from an unmapped or re-mapped area.

When the robot 102 is operating in the guided drive mode, the guided drive mode operation circuitry 206 of the example navigation awareness control circuitry 132 of FIG. 2 generates instructions to cause the robot 102 to move based on the position of the auxiliary fiducial 140. The guided drive mode operation circuitry 206 executes guided drive mode operation rule(s) 220 to determine movement of the robot 102 while operating in the guided drive mode. The guided drive mode operation rule(s) 220 can be defined based on user inputs and stored in the database 208. The guided drive mode operation circuitry 206 communicates with the robot control circuitry 114 to cause the robot 102 to move based on instructions generated by the guided drive mode operation circuitry 206.

In some examples, the guided drive mode operation circuitry 206 determines the maneuvers to be performed by the robot 102 to maintain the auxiliary fiducial 140 within a defined portion of a field of view of the image sensor(s) 122 (e.g., centered within the field of view of the image sensor(s) 122). In some examples, the guided drive mode operation circuitry 206 determines maneuvers to be performed by the robot 102 to maintain the auxiliary fiducial 140 at some distance x (e.g., a fixed distance x or within some range of x). The guided drive mode operation circuitry 206 outputs instructions to cause the robot 102 to move forward/backward, left/right to keep the auxiliary fiducial 140 within the defined portion of the field of view of the image sensor(s) 122, within the fixed distance of the auxiliary fiducial 140, etc. The robot control circuitry 114 executes the instructions from the guided drive mode operation circuitry 206 to cause the robot 102 to perform the movements. As a result, the user can guide the robot 102 to a particular location in the environment 104 by holding the user device 106 within the field of the view of the image sensor(s) 122, which causes the robot 102 to move in a direction corresponding to a position of the auxiliary fiducial 140 (e.g., toward the auxiliary fiducial 140). The user can, for instance, walk while displaying the auxiliary fiducial 140 via the user device 106 to cause the robot 102 to move (e.g., follow the auxiliary fiducial 140) based on instructions generated by the guided drive mode operation circuitry 206.

In some examples, the user causes the robot 102 to move in a particular direction by manipulating the user device 106 while the auxiliary fiducial 140 is presented on the display screen 142, thereby changing the position of the auxiliary fiducial 140 relative to the robot 102. For example, the user can perform gestures such as moving the user device 106 to the left, raising or lowering the user device 106, etc. to direct the robot 102 to, for instance, a fixed fiducial 134 in the environment 104. The guided drive mode operation circuitry 206 causes the robot 102 to move in a direction corresponding to a position of the auxiliary fiducial 140 as defined by the user gesture(s). The guided drive mode operation circuitry 206 can perform gesture recognition based on images captured by the image sensor(s) 122 of the user performing gestures to direct the robot 102. The guided drive mode operation rule(s) 220 can include image analysis algorithms, gesture recognition algorithms, etc. The guided drive mode operation circuitry 206 executes the algorithms to associate the user gesture(s) with different robot maneuvers (e.g., forward/backward, left/right). Based on the gesture recognition analysis, the guided drive mode operation circuitry 206 determines how the robot 102 should move and outputs corresponding instructions to be implemented by the robot control circuitry 114. As a result, the robot control circuitry 114 causes the robot 102 to move in a direction corresponding to a position of the auxiliary fiducial 140 relative to the robot 102.

When the robot 102 is in the guided drive mode, the drive safety control circuitry 118 (FIG. 1) remains active to detect obstacles and provide for collision avoidance. Thus, in some examples, the instructions generated by the guided drive mode operation circuitry 206 are modified by the drive safety control circuitry 118 if, for instance, the direction in which the guided drive mode operation circuitry 206 determines that the robot 102 should move would cause the robot 102 to collide with another object in the environment 104 (e.g., another robot, inventory, a user in the warehouse, etc.). Thus, although the guided drive mode substantially overrides autonomous travel trajectories of the robot 102, in some instances the robot control circuitry 114 may cause the robot 102 to move autonomously for safety purposes.

In some examples, the navigation awareness control circuitry 132 includes means for detecting position. For example, the means for detecting position may be implemented by the position detection circuitry 200. In some examples, the position detection circuitry 200 may be instantiated by processor circuitry such as the example processor circuitry 412 of FIG. 4. For instance, the position detection circuitry 200 may be instantiated by the example microprocessor 500 of FIG. 5 executing machine executable instructions such as those implemented by at least block 318 of FIG. 8. In some examples, the position detection circuitry 200 may be instantiated by hardware logic circuitry, which may be implemented by an ASIC, XPU, or the FPGA circuitry 600 of FIG. 6 structured to perform operations corresponding to the machine readable instructions. Additionally or alternatively, the position detection circuitry 200 may be instantiated by any other combination of hardware, software, and/or firmware. For example, the position detection circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the navigation awareness control circuitry 132 includes means for detecting a fiducial. For example, the means for detecting a fiducial may be implemented by the fiducial detection circuitry 202. In some examples, the fiducial detection circuitry 202 may be instantiated by processor circuitry such as the example processor circuitry 412 of FIG. 4. For instance, the fiducial detection circuitry 202 may be instantiated by the example microprocessor 500 of FIG. 5 executing machine executable instructions such as those implemented by at least blocks 304, 314, 316, 332 of FIG. 3. In some examples, the fiducial detection circuitry 202 may be instantiated by hardware logic circuitry, which may be implemented by an ASIC, XPU, or the FPGA circuitry 600 of FIG. 6 structured to perform operations corresponding to the machine readable instructions. Additionally or alternatively, the fiducial detection circuitry 202 may be instantiated by any other combination of hardware, software, and/or firmware. For example, the fiducial detection circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the navigation awareness control circuitry 132 includes means for controlling a drive mode. For example, the means for controlling a drive mode may be implemented by the drive mode control circuitry 204. In some examples, the drive mode control circuitry 204 may be instantiated by processor circuitry such as the example processor circuitry 412 of FIG. 4. For instance, the drive mode control circuitry 204 may be instantiated by the example microprocessor 500 of FIG. 5 executing machine executable instructions such as those implemented by at least blocks 306, 320, 322, 324, 326, 328, 330, 334 of FIG. 3. In some examples, the drive mode control circuitry 204 may be instantiated by hardware logic circuitry, which may be implemented by an ASIC, XPU, or the FPGA circuitry 600 of FIG. 6 structured to perform operations corresponding to the machine readable instructions. Additionally or alternatively, the drive mode control circuitry 204 may be instantiated by any other combination of hardware, software, and/or firmware. For example, the drive mode control circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the navigation awareness control circuitry 132 includes means for operating a guided drive mode. For example, the means for operating a guided drive mode may be implemented by the guided drive mode operation circuitry 206. In some examples, the guided drive mode operation circuitry 206 may be instantiated by processor circuitry such as the example processor circuitry 412 of FIG. 4. For instance, the guided drive mode operation circuitry 206 may be instantiated by the example microprocessor 500 of FIG. 5 executing machine executable instructions such as those implemented by at least blocks 308, 310, 312 of FIG. 3. In some examples, the guided drive mode operation circuitry 206 may be instantiated by hardware logic circuitry, which may be implemented by an ASIC, XPU, or the FPGA circuitry 600 of FIG. 6 structured to perform operations corresponding to the machine readable instructions. Additionally or alternatively, the guided drive mode operation circuitry 206 may be instantiated by any other combination of hardware, software, and/or firmware. For example, the guided drive mode operation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the navigation awareness control circuitry 132 of FIG. 1 is illustrated in FIG. 2, one or more of the elements, processes, and/or devices illustrated in FIG. 2 may be combined, divided, re-arranged, omitted, eliminated, and/or implemented in any other way. Further, the example position detection circuitry 200, the example fiducial detection circuitry 202, the example drive mode control circuitry 204, the example guided drive mode operation circuitry 206 and/or, more generally, the example navigation awareness control circuitry 132 of FIG. 1, may be implemented by hardware alone or by hardware in combination with software and/or firmware. Thus, for example, any of the example position detection circuitry 200, the example fiducial detection circuitry 202, the example drive mode control circuitry 204, the example guided drive mode operation circuitry 206 and/or, more generally, the example navigation awareness control circuitry 132, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example navigation awareness control circuitry 132 of FIG. 1 may include one or more elements, processes, and/or devices in addition to, or instead of, those illustrated in FIG. 2, and/or may include more than one of any or all of the illustrated elements, processes, and devices.

Figure 3:
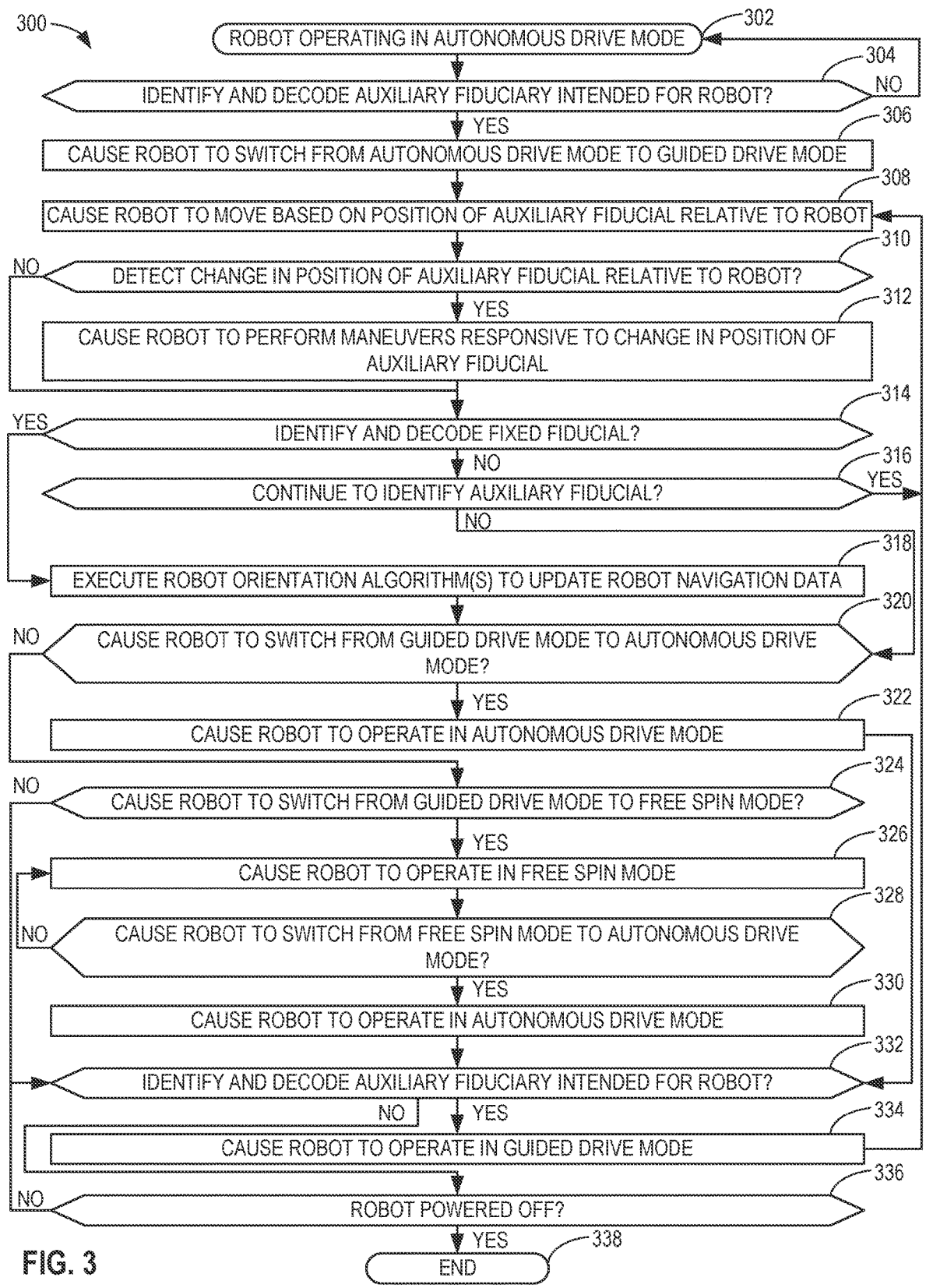
FIG. 3 is a flowchart representative of example machine readable instructions and/or example operations that may be executed by example processor circuitry to implement the navigation awareness control circuitry of FIG. 2.

A flowchart representative of example machine readable instructions, which may be executed to configure processor circuitry to implement the navigation awareness control circuitry 132 of FIG. 2, is shown in FIG. 3. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example navigation awareness control circuitry 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 1 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to cause an autonomous robot (e.g., the autonomous robot 102 of FIG. 1) to generate navigation data to orient the robot within an environment (e.g., the environment 104 of FIG. 1). The machine readable instructions and/or the operations 300 of FIG. 3 begin at block 302, at which the robot 102 is operating in the autonomous drive mode (e.g., based on instructions from the robot control circuitry 114 of FIG. 1).

At block 304, the fiducial detection circuitry 202 of the example navigation awareness control circuitry 132 of FIG. 2 determines if an auxiliary fiducial 140 presented via, for instance, the user device 106 has been identified as an intended fiducial for the robot 102. The fiducial detection circuitry 202 analyzes the image data output by the image sensor(s) 122 of the robot 102 to detect the auxiliary fiducial 140 and confirm the auxiliary fiducial 140 is intended for the robot 102 based on the fiducial detection rule(s) 214. In some examples, the fiducial detection circuitry 202 is prompted to look for the auxiliary fiducial 140 in response to the position detection circuitry 200 of the navigation awareness control circuitry 132 indicating that the navigation data 212 for the robot 102 has not been updated within a threshold period of time. In some examples, the fiducial detection circuitry 202 periodically scans the image data for the auxiliary fiducial 140 without instructions from the position detection circuitry 200 (and/or without the robot previously determining or recognizing that the robot 102 is lost). The fiducial detection circuitry 202 decodes the data encoded in the auxiliary fiducial 140 to identify, for example, instructions for the robot 102 to follow the auxiliary fiducial 140).

If the fiducial detection circuitry 202 identifies and decodes the auxiliary fiducial 140, then at block 306, the drive mode control circuitry 204 generates instructions to cause the robot 102 to switch from operating in the autonomous drive mode to operating in the guided drive mode, or a semi-autonomous drive mode. The drive mode control circuitry 204 communicates with the robot control circuitry 114 to cause the robot 102 to enter the guided drive mode in which the robot 102 moves on its own (e.g., based on instructions from the robot control circuitry 114), but a travel trajectory of the robot 102 is defined by the user.

At block 308, the guided drive mode operation circuitry 206 causes the robot 102 to move based on a position of the auxiliary fiducial 140 relative to the robot 102. For example, based on the guided drive mode operation rule(s) 220, the guided drive mode operation circuitry 206 generates instructions to cause, for example, the robot 102 to move to maintain the auxiliary fiducial 140 at a particular position relative to the field of view of the image sensor(s) 122 (e.g., centered relative to the field of view), within a threshold distance of the robot 102, etc.

At block 310, the guided drive mode operation circuitry 206 determines if the position of the auxiliary fiducial 140 relative to the robot 102 has changed. For example, a user can manipulate the position of the auxiliary fiducial 140 by performing gestures with a hand that is holding the user device 106 while the auxiliary fiducial 140 is presented on the display screen 142 of the user device 106 (e.g., moving the user device 106 to the right or left). At block 312, the guided drive mode operation circuitry 206 causes the robot 102 to move in response to change(s) in the position of the auxiliary fiducial 140. For example, the guided drive mode operation circuitry 206 interprets the gestures performed by the user based on the guided drive mode operation rule(s) 220. The guided drive mode operation circuitry 206 determines the maneuvers to be performed by the robot 102 based on the gestures (e.g., move left, move right) and outputs instructions to cause the robot control circuitry 114 to implement the movements.

At block 314, the fiducial detection circuitry 202 determines if a fixed fiducial 134 in the environment 104 has been identified. For example, the fiducial detection circuitry 202 analyzes image data generated by the image sensor(s) 122 while the robot 102 is operating in the guided drive mode to identify the fixed fiducial 134. The fiducial detection circuitry 202 decodes the values associated with the fixed fiducial 134, which can include coordinates of the location of the fixed fiducial 134 in the environment 104.

If the fiducial detection circuitry 202 does not identify a fixed fiducial 134, then at block 316, the fiducial detection circuitry 202 determines if the auxiliary fiducial 140 is still being presented. If the fiducial detection circuitry 202 continues to detect the auxiliary fiducial 140, then control proceeds to block 308 at which the robot 102 continues to move based on the position of the auxiliary fiducial 140.

When the fiducial detection circuitry 202 identifies and decodes the fixed fiducial 134, the position detection circuitry 200 executes the robot orientation algorithm(s) 210 at block 318 based on the values (e.g., position data) associated with the fixed fiducial 134. The position detection circuitry 200 updates the navigation data 212 for the robot 102 to (re-)orient the robot 102 relative to the environment 104.

At block 320, the drive mode control circuitry 204 determines if the robot 102 should switch from the guided drive mode to the autonomous drive mode. The drive mode control circuitry 204 can determine that the robot should re-enter the autonomous drive mode in response to, for example, the fiducial detection circuitry 202 no longer detecting the auxiliary fiducial 140 (block 316) or the position detection circuitry 200 updating the navigation data 212 (block 318). If the drive mode control circuitry 204 determines that the robot 102 should switch from the guided drive mode to the autonomous drive mode (e.g., based on the drive mode rule(s) 218, user input(s) at the auxiliary fiducial application 144 or the robot 102), then at block 322, the drive mode control circuitry 204 generates instructions to cause the robot 102 to operate in the autonomous drive mode (e.g., via the robot control circuitry 114).

If the drive mode control circuitry 204 determines that the robot 102 should not re-enter the autonomous drive mode, then at block 324, the drive mode control circuitry 204 determines if the robot 102 should switch from the guided drive mode to the free spin mode based on, for example, user inputs. At block 326, the drive mode control circuitry 204 communicates with the robot control circuitry 114 to cause the motor(s) 108 of the robot 102 to enter a neutral state to enable the robot 102 to be moved manually. The robot 102 remains in the free spin mode until the drive mode control circuitry 204 determines that the robot 102 should operate in the autonomous drive mode (blocks 328, 330) or the fiducial detection circuitry 202 detects an auxiliary fiducial 140 (e.g., another auxiliary fiducial 140) (block 332).

In some examples, the robot 102 remains in the guided drive mode for as long as the fiducial detection circuitry 202 detects an auxiliary fiducial 140 and continues to move based on a position of the auxiliary fiducial 140 (blocks 324, 332). In response to continuing to identify the auxiliary fiducial 140 or identifying another auxiliary fiducial 140, the drive mode control circuitry 204 causes the robot 102 to operate in the guided drive mode (block 334) and control returns to block 308. The example instructions 300 of FIG. 3 end when the robot 102 is powered off (blocks 336, 338).

Figure 4:
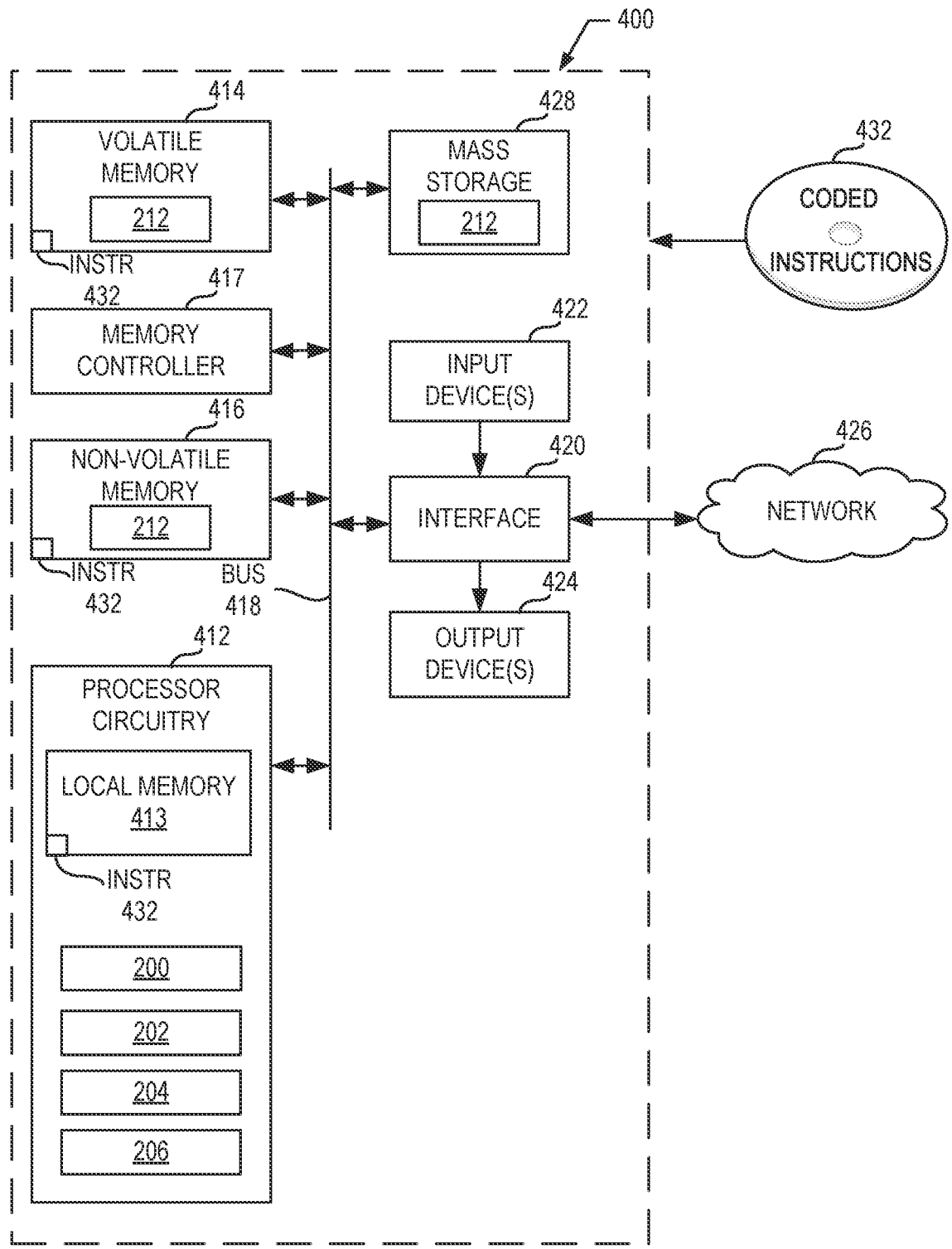
FIG. 4 is a block diagram of an example processing platform including processor circuitry structured to execute the example machine readable instructions and/or the example operations of FIG. 3 to implement the navigation awareness control circuitry of FIG. 2.

FIG. 4 is a block diagram of an example processor platform 400 structured to execute and/or instantiate the machine readable instructions and/or the operations of FIG. 3 to implement the navigation awareness control circuitry 132 of FIG. 3. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs, microprocessors, CPUs, GPUs, DSPs, and/or microcontrollers from any desired family or manufacturer. The processor circuitry 412 may be implemented by one or more semiconductor based (e.g., silicon based) devices. In this example, the processor circuitry 412 implements the example position detection circuitry 200, the example fiducial detection circuitry 202, the example drive mode control circuitry 204, and the example guided drive mode operation circuitry 206.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417.

The processor platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 400 of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 432, which may be implemented by the machine readable instructions of FIG. 3, may be stored in the mass storage device 428, in the volatile memory 414, in the non-volatile memory 416, and/or on a removable non-transitory computer readable storage medium such as a CD or DVD.

Figure 5:
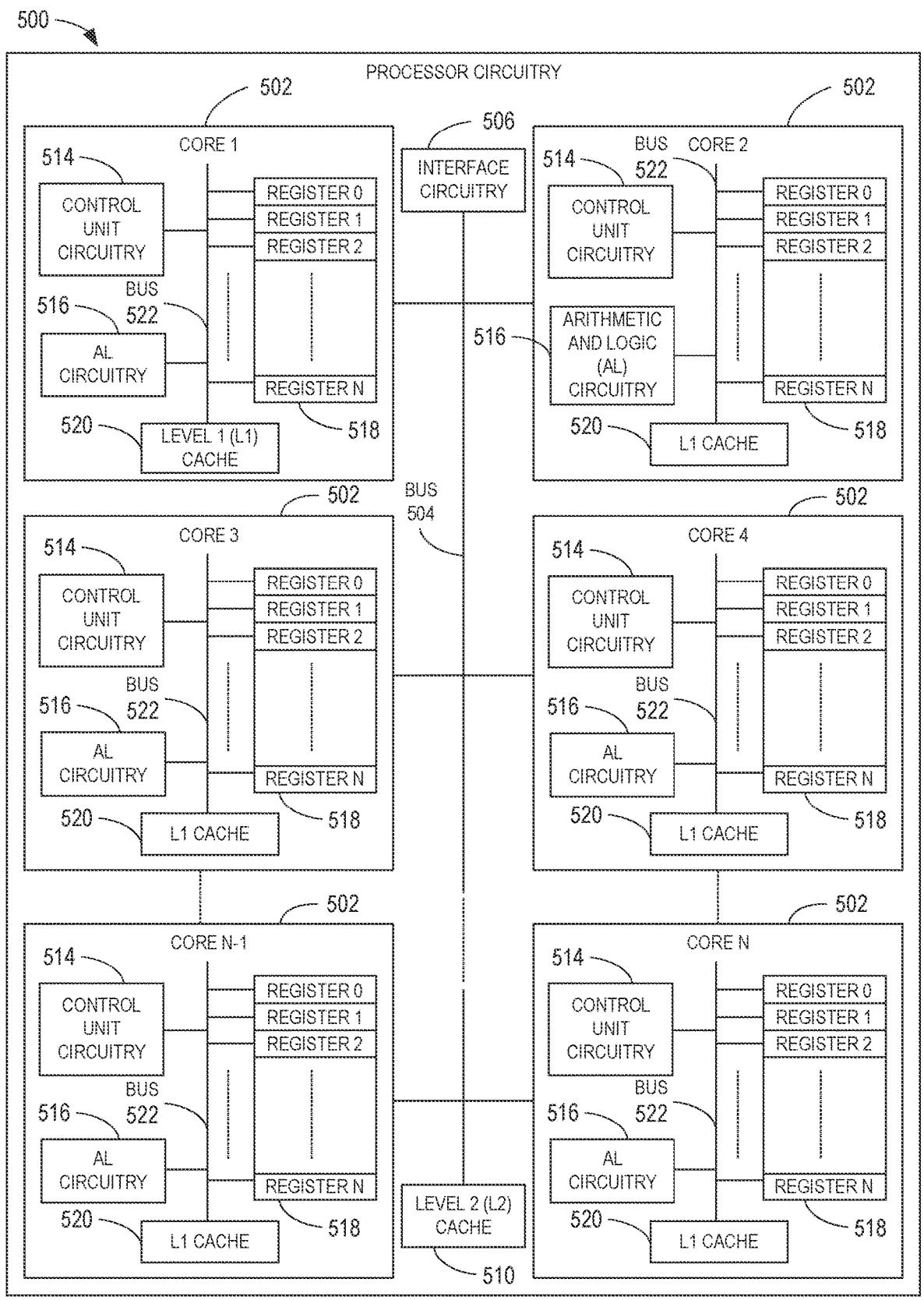
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a microprocessor 500. For example, the microprocessor 500 may be a general purpose microprocessor (e.g., general purpose microprocessor circuitry). The microprocessor 500 executes some or all of the machine readable instructions of the flowchart of FIG. 3 to effectively instantiate the circuitry of FIG. 2 as logic circuits to perform the operations corresponding to those machine readable instructions. In some such examples, the circuitry of FIG. 2 is instantiated by the hardware circuits of the microprocessor 500 in combination with the instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIG. 3.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s), SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The second bus 522 may be implemented by at least one of an I2C bus, a SPI bus, a PCI bus, or a PCIe bus Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
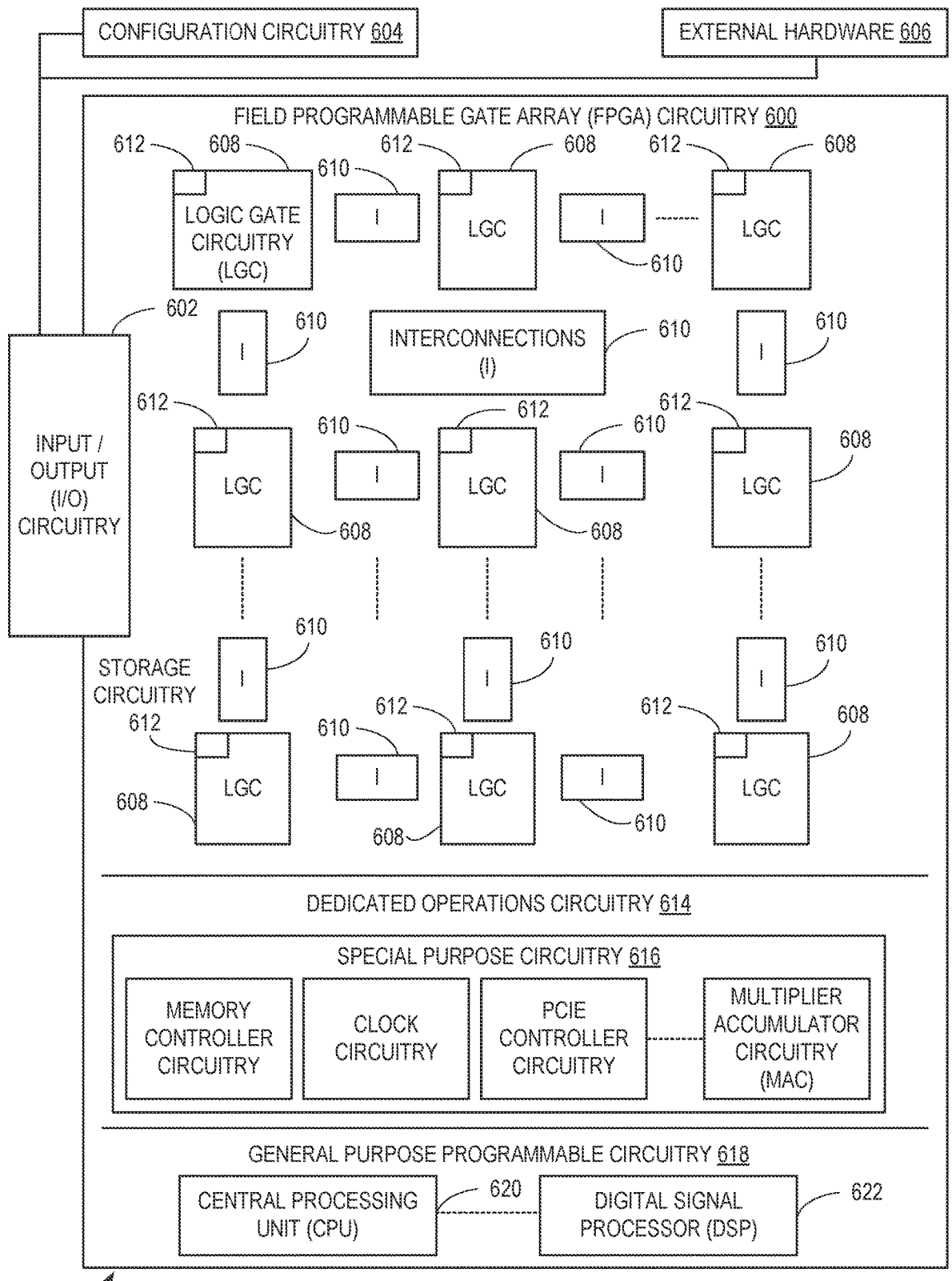
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIG. 3 but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowchart of FIG. 3. As such, the FPGA circuitry 600 may be structured to effectively instantiate some or all of the machine readable instructions of the flowchart of FIG. 3 as dedicated logic circuits to perform the operations corresponding to those software instructions in a dedicated manner analogous to an ASIC. Therefore, the FPGA circuitry 600 may perform the operations corresponding to the some or all of the machine readable instructions of FIG. 3 faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 606 may be implemented by external hardware circuitry. For example, the external hardware 606 may be implemented by the microprocessor 500 of FIG. 5. The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations that may correspond to at least some of the machine readable instructions of FIG. 3 and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an onboard CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowchart of FIG. 3 may be executed by one or more of the cores 502 of FIG. 5, a second portion of the machine readable instructions represented by the flowchart of FIG. 3 may be executed by the FPGA circuitry 600 of FIG. 6, and/or a third portion of the machine readable instructions represented by the flowchart of FIG. 3 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

Figure 7:
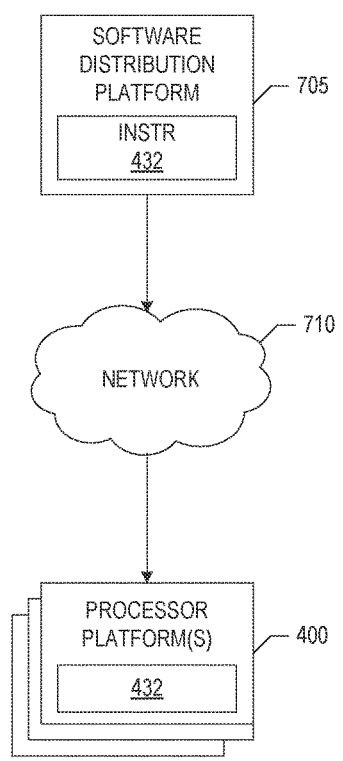
FIG. 7 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to hardware devices owned and/or operated by third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions 300 of FIG. 3, as described above. The one or more servers of the example software distribution platform 705 are in communication with an example network 710, which may correspond to any one or more of the Internet and/or any of the example networks 426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions 300 of FIG. 3, may be downloaded to the example processor platform 400, which is to execute the machine readable instructions 432 to implement the navigation awareness control circuitry 132. In some examples, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices.

From the foregoing, it will be appreciated that example systems, methods, apparatus, and articles of manufacture have been disclosed that facilitate guidance of autonomous robots using visual fiducials. Examples disclosed herein use a non-fixed visual fiducial (e.g., a virtual fiducial) presented via a user device to cause an autonomous robot to switch from an autonomous drive mode to a guided drive mode to enable the robot to be maneuvered by a user in an environment. In examples disclosed herein, the autonomous robot responds performs maneuvers to follow a travel path defined by the non-fixed visual fiducial (e.g., user gestures changing a position of the virtual fiducial relative to the robot). In the guided drive mode, example autonomous vehicles disclosed herein can identify a fixed visual fiducial in the environment to update navigation data for the robot and, thus, orient the robot relative to the environment. Examples disclosed herein provide for efficient control of a robot using an auxiliary fiducial in examples in which, for instance, the ability of the robot to otherwise update the navigation data using a fixed fiducial or techniques such as dead reckoning is disrupted. Example robots resume autonomous travel using accurate navigation data.

Example systems, apparatus, and methods for autonomous robot guidance are disclosed herein. Further examples and combinations thereof include the following:

Example 1 includes an autonomous robot comprising an image sensor; memory; machine readable instructions; and processor circuitry to execute the machine readable instructions to detect a first fiducial based on image data corresponding to outputs of the image sensor collected while the autonomous robot is in a first drive mode, the first drive mode corresponding to an autonomous drive mode; cause the autonomous robot to switch from the first drive mode to a second drive mode responsive to the detection of the first fiducial, the autonomous robot to move in the second drive mode in a direction corresponding to a position of the first fiducial relative to the autonomous robot; generate navigation data for the autonomous robot, the navigation data indicative of a position of the autonomous robot in an environment; and cause the autonomous robot to switch from the second drive mode to the first drive mode, the autonomous robot to travel in the first drive mode based on the navigation data after the switch from the second drive mode.

Example 2 includes the autonomous robot of example 1, wherein the processor circuitry is to detect a second fiducial based on image data corresponding to outputs of the image sensor collected while the autonomous robot is in the second drive mode; and generate the navigation data for the autonomous robot based on the second fiducial.

Example 3 includes the autonomous robot of examples 1 or 2, wherein first fiducial is moveable relative to the environment in which the autonomous robot is located and the second fiducial is fixed relative to the environment.

Example 4 include the autonomous robot of any of examples 1-3, wherein the first fiducial is a virtual fiducial.

Example 5 includes the autonomous robot of any of examples 1-4, wherein the processor circuitry is to cause the autonomous robot to switch from the first drive mode to the second drive mode responsive to detection of the first fiducial for a threshold period of time.

Example 6 includes the autonomous robot of any of examples 1-5, wherein the processor circuitry is to cause the autonomous robot to switch from the first drive mode to the second drive mode responsive to detection of the first fiducial within a portion of a field of view of the image sensor.

Example 7 includes the autonomous robot of any of examples 1-6, wherein the processor circuitry is to cause the autonomous robot to move to maintain a position of the first fiducial relative to a field of view of the image sensor while the autonomous robot is in the second drive mode.

Example 8 includes the autonomous robot of any of examples 1-7, wherein the processor circuitry is to detect, while the autonomous robot is in the second drive mode, a gesture based on the image data, the gesture associated with movement of the first fiducial; determine, based on the gesture, a maneuver; and cause the autonomous robot to move based on the maneuver.

Example 9 includes an apparatus comprising memory; machine-readable instructions; and processor circuitry to execute the machine-readable instructions to identify a first marker in image data corresponding to outputs of an image sensor of an autonomous vehicle collected while the autonomous vehicle is in an autonomous drive mode; cause the autonomous vehicle to switch from the autonomous drive mode to a second drive mode based on data associated with the first marker; cause the autonomous vehicle to perform a first maneuver in the second drive mode based on a first position of the first marker relative to the autonomous vehicle; determine location information for the autonomous vehicle in an environment; and cause the autonomous vehicle to switch from the second drive mode to the autonomous drive mode, the autonomous vehicle to operate in the autonomous drive mode based on the location information after the switch from the second drive mode.

Example 10 includes the apparatus of example 9, wherein the processor circuitry is to detect a change of the first marker from the first position to a second position relative to the autonomous vehicle based on the image data; and cause the autonomous vehicle to perform a second maneuver in the second drive mode based on the second position of the first marker.

Example 11 includes the apparatus of examples 9 or 10, wherein the processor circuitry is to detect a second marker based on image data corresponding to outputs of the image sensor collected while the autonomous vehicle is in the second drive mode; and generate the location information for the autonomous vehicle based on data associated with the second marker.

Example 12 includes the apparatus of any of examples 9-11, wherein the processor circuitry is to cause the autonomous vehicle to switch from the second drive mode to the autonomous drive mode in response to detection of the second marker.

Example 13 includes the apparatus of any of examples 9-12, wherein the processor circuitry is to cause the autonomous vehicle to perform the first maneuver to maintain a first distance from the first marker.

Example 14 includes the apparatus of any of examples 9-13, wherein the first marker is a virtual marker.

Example 15 includes a non-transitory machine readable storage medium comprising instructions that cause processor circuitry to at least detect a first fiducial based on image data corresponding to outputs of an image sensor collected while an autonomous robot is in a first drive mode, the first drive mode corresponding to an autonomous drive mode; cause the autonomous robot to switch from the first drive mode to a second drive mode responsive to the detection of the first fiducial, the autonomous robot to move in the second drive mode in a direction corresponding to a position of the first fiducial relative to the autonomous robot; generate navigation data for the autonomous robot, the navigation data indicative of a position of the autonomous robot in an environment; and cause the autonomous robot to switch from the second drive mode to the first drive mode, the autonomous robot to travel in the first drive mode based on the navigation data after the switch from the second drive mode.

Example 16 includes the non-transitory machine readable storage medium of example 15, wherein the instructions cause the processor circuitry to detect a second fiducial based on image data corresponding to outputs of the image sensor collected while the autonomous robot is in the second drive mode; and generate the navigation data for the autonomous robot based on the second fiducial.

Example 17 includes the non-transitory machine readable storage medium of examples 15 or 16, wherein the instructions cause the processor circuitry to cause the autonomous robot to switch from the first drive mode to the second drive mode responsive to detection of the first fiducial for a threshold period of time.

Example 18 includes the non-transitory machine readable storage medium of any of examples 15-17, wherein the instructions cause the processor circuitry to cause the autonomous robot to switch from the first drive mode to the second drive mode responsive to detection of the first fiducial within a portion of a field of view of the image sensor.

Example 19 includes the non-transitory machine readable storage medium of any of examples 15-18, wherein the instructions cause the processor circuitry to cause the autonomous robot to move to maintain a position of the first fiducial relative to a field of view of the image sensor while the autonomous robot is in the second drive mode.

Example 20 includes the non-transitory machine readable storage medium of any of examples 15-19, wherein the instructions cause the processor circuitry to detect, while the autonomous robot is in the second drive mode, a gesture based on the image data, the gesture associated with movement of the first fiducial; determine, based on the gesture, a maneuver; and cause the autonomous robot to move based on the maneuver.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An autonomous robot comprising:
an image sensor;
memory;
machine readable instructions; and
at least one processor circuit to execute the machine readable instructions to:
cause the autonomous robot to travel in an autonomous drive mode;

responsive to a loss of access to first navigation data while the autonomous robot is in the autonomous drive mode, cause the autonomous robot to generate a notification;

after generation of the notification, cause the autonomous robot to switch from the autonomous drive mode to a guided drive mode responsive to detection of an auxiliary fiducial, the auxiliary fiducial displayed by a user device, the autonomous robot to move in the guided drive mode in a direction corresponding to a position of the auxiliary fiducial relative to the autonomous robot;

detect a fixed fiducial based on image data corresponding to outputs of the image sensor collected while the autonomous robot is moving in the guided drive mode;

generate second navigation data for the autonomous robot based on the fixed fiducial; and cause the autonomous robot to switch from the guided drive mode to the autonomous drive mode and to travel in the autonomous drive mode using the second navigation data.

2. The autonomous robot of claim 1, wherein the auxiliary fiducial is moveable relative to an environment in which the autonomous robot is located via movement of the user device.

3. The autonomous robot of claim 1, wherein the first auxiliary fiducial is a virtual fiducial.

4. The autonomous robot of claim 1, wherein one or more of the at least one processor circuit is to cause the autonomous robot to switch from the autonomous drive mode to the guided drive mode responsive to detection of the auxiliary fiducial for a threshold period of time.

5. The autonomous robot of claim 1, wherein one or more of the at least one processor circuit is to cause the autonomous robot to switch from the autonomous drive mode to the guided drive mode responsive to detection of the auxiliary fiducial within a portion of a field of view of the image sensor.

6. The autonomous robot of claim 1, wherein one or more of the at least one processor circuit is to cause the autonomous robot to move to maintain a position of the auxiliary fiducial relative to a field of view of the image sensor while the autonomous robot is in the guided drive mode.

7. The autonomous robot of claim 1, wherein one or more of the at least one processor circuit is to:
detect, while the autonomous robot is in the guided drive mode, a gesture based on the image data, the gesture associated with movement of the auxiliary fiducial;
determine, based on the gesture, a maneuver; and
cause the autonomous robot to move based on the maneuver.

8. An apparatus comprising:
memory;
machine-readable instructions; and
at least one processor circuitry circuit to execute the machine-readable instructions to:
cause an autonomous vehicle to travel in an autonomous drive mode;
cause the autonomous vehicle to generate a notification indicative of an unconfirmed position of the autonomous vehicle in an environment while the autonomous vehicle is in the autonomous drive mode;
after generation of the notification, cause the autonomous vehicle to switch from the autonomous drive mode to a guided drive mode based on data associated with a movable marker;
cause the autonomous vehicle to perform a first maneuver in the guided drive mode based on a first position of the first movable marker relative to the autonomous vehicle;
detect a fixed marker based on image data corresponding to outputs of an image sensor collected while the autonomous vehicle is moving in the guided drive mode
determine location information for the autonomous vehicle in the environment based on the fixed marker; and
cause the autonomous vehicle to switch from the guided drive mode to the autonomous drive mode and to travel in the autonomous drive mode using the location information.

9. The apparatus of claim 8, wherein one or more of the at least one processor circuit is to:
detect a change of the movable marker from the first position to a second position relative to the autonomous vehicle based on the image data; and
cause the autonomous vehicle to perform a second maneuver in the guided drive mode based on the second position of the movable marker.

10. The apparatus of claim 8, wherein one or more of the at least one processor circuit is to cause the autonomous vehicle to switch from the guided drive mode to the autonomous drive mode in response to detection of the fixed marker.

11. The apparatus of claim 8, wherein one or more of the at least one processor circuit is to cause the autonomous vehicle to perform the first maneuver to maintain a first distance from the movable marker.

12. The apparatus of claim 8, wherein the movable marker is a virtual marker.

13. A non-transitory machine readable storage medium comprising machine-readable instructions to cause at least one processor circuit to at least:
cause an autonomous robot to travel in an autonomous drive mode;
responsive to a loss of access to first navigation data while the autonomous robot is in the autonomous drive mode, cause the autonomous robot to generate a notification;
after generation of the notification, cause the autonomous robot to switch from the autonomous drive mode to a guided drive mode responsive to detection of an auxiliary fiducial, the auxiliary fiducial displayed by a user device, the autonomous robot to move in the guided drive mode in a direction corresponding to a position of the auxiliary fiducial relative to the autonomous robot;
detect a fixed fiducial based on image data corresponding to outputs of an image sensor collected while the autonomous robot is moving in the guided drive mode;
generate second navigation data for the autonomous robot based on the fixed fiducial; and
cause the autonomous robot to switch from the guided drive mode to the autonomous drive mode and to travel in the autonomous drive mode using the second navigation data.

14. The non-transitory machine readable storage medium of claim 13, wherein the machine-readable instructions are to cause one or more of the at least one processor circuit to cause the autonomous robot to switch from the autonomous drive mode to the guided drive mode responsive to detection of the auxiliary fiducial for a threshold period of time.

15. The non-transitory machine readable storage medium of claim 13, wherein the machine-readable instructions are to cause one or more the at least one processor circuit to cause the autonomous robot to switch from the guided drive mode to the autonomous drive mode responsive to detection of the auxiliary fiducial within a portion of a field of view of the image sensor.

16. The non-transitory machine readable storage medium of claim 13, wherein the machine-readable instructions are to cause one or more of the at least one processor circuit to cause the autonomous robot to move to maintain a position of the auxiliary fiducial relative to a field of view of the image sensor while the autonomous robot is in the guided drive mode.

17. The non-transitory machine readable storage medium of claim 13, wherein the machine-readable instructions are to cause one or more of the at least one processor circuit to:

detect, while the autonomous robot is in the guided drive mode, a gesture based on the image data, the gesture associated with movement of the auxiliary fiducial;

determine, based on the gesture, a maneuver; and cause the autonomous robot to move based on the maneuver.

18. The autonomous robot of claim 1, wherein one or more of the at least one processor circuit is to detect the loss of access to the first navigation data responsive to a failure to determine a position of the autonomous robot in an environment.

19. The apparatus of claim 8, wherein one or more of the at least one processor circuit is to cause the autonomous vehicle to generate the notification responsive to the unconfirmed position of the autonomous vehicle being unconfirmed for a threshold period of time.

20. The non-transitory machine readable storage medium of claim 13, wherein the machine-readable instructions are to cause one or more of the at least one processor circuit to detect the loss of access to the first navigation data responsive to a failure to determine a position of the autonomous robot in an environment.

* * * * *

UNITED STATES PATENT AND TRADEMARK OFFICE
CERTIFICATE OF CORRECTION

| | | |
|---|---|---|
| PATENT NO. | : 12,466,076 B2 | Page 1 of 1 |
| APPLICATION NO. | : 18/190593 | |
| DATED | : November 11, 2025 | |
| INVENTOR(S) | : Caine et al. | |

It is certified that error appears in the above-identified patent and that said Letters Patent is hereby corrected as shown below:

On the Title Page

Item (73) Replace "Ocado Innovatin Limited, Hatfield (GB)" with --Ocado Innovation Limited, Hatfield (GB)--

In the Claims

Column 31, Claim 3, Line 27, Delete: "first"

Column 31, Claim 8, Line 55, Delete: "circuitry"

Signed and Sealed this
Thirteenth Day of January, 2026

John A. Squires
*Director of the United States Patent and Trademark Office*